(12) United States Patent
Mladenovic et al.

(10) Patent No.: US 6,795,405 B1
(45) Date of Patent: Sep. 21, 2004

(54) DIGITAL MODEM ECHO CANCELER ENHANCEMENT

(75) Inventors: Zoran Mladenovic, Bethesda, MD (US); Piyush Shankerbhai Patel, Gaithersburg, MD (US)

(73) Assignee: Telogy Networks, Inc., Germantown, MD (US)

( * ) Notice: Subject to any disclaimer, the term of this patent is extended or adjusted under 35 U.S.C. 154(b) by 0 days.

(21) Appl. No.: 09/472,031

(22) Filed: Dec. 27, 1999

(51) Int. Cl.[7] ............................................. H04B 3/23
(52) U.S. Cl. ............................. 370/286; 379/406.01
(58) Field of Search ..................... 370/268, 269, 370/252, 286, 289–292; 455/296, 310, 307; 379/406.01–406.16; 375/222, 242, 244, 253, 246, 346

(56) References Cited

U.S. PATENT DOCUMENTS

| | | | |
|---|---|---|---|
| 4,507,747 A | | 3/1985 | Houdard et al. ............ 364/724 |
| 5,005,168 A | * | 4/1991 | Cummiskey et al. ....... 370/276 |
| 5,177,734 A | * | 1/1993 | Cummiskey et al. ....... 370/290 |
| 5,247,512 A | | 9/1993 | Sugaya et al. ............. 370/32.1 |
| 5,305,309 A | | 4/1994 | Chujo et al. ............... 370/32.1 |
| 5,315,585 A | | 5/1994 | Iizuka et al. ............... 370/32.1 |
| 5,768,308 A | | 6/1998 | Pon et al. ................... 375/219 |
| 5,790,658 A | * | 8/1998 | Yip et al. ............... 379/406.09 |
| 5,796,731 A | | 8/1998 | Mellado et al. ............. 370/362 |
| 5,828,696 A | * | 10/1998 | Gelblum et al. ............ 375/222 |
| 5,995,540 A | * | 11/1999 | Draganic ..................... 375/222 |
| 6,259,680 B1 | * | 7/2001 | Blackwell et al. .......... 370/286 |
| 6,317,419 B1 | * | 11/2001 | Olafsson et al. ............ 370/292 |
| 6,504,865 B1 | * | 1/2003 | Liang et al. ................ 375/222 |
| 6,580,793 B1 | * | 6/2003 | Dunn et al. ............ 379/406.04 |
| 6,584,078 B1 | * | 6/2003 | Betts .......................... 370/276 |
| 6,597,732 B1 | * | 7/2003 | Dowling ..................... 375/222 |

FOREIGN PATENT DOCUMENTS

| | | |
|---|---|---|
| EP | 0177239 A | 9/1985 |
| WO | 99/60720 | 11/1999 |

* cited by examiner

*Primary Examiner*—Hassan Kizou
*Assistant Examiner*—Gregory B Sefcheck
(74) *Attorney, Agent, or Firm*—Warren L. Franz; W. James Brady; Frederick J. Telecky, Jr.

(57) ABSTRACT

A modem-based echo cancellation enhancement for digital communications networks is provided. The effects on echo cancellation of non-linearity in a far end echo path in a digital telephone system are reduced by introduction of non-linearities into the near end signal prior to generation of the echo cancellation signal. Near end signal is sampled after linear to PCM conversion. A PCM to linear conversion is added prior to the echo canceler. The near end delay line can be provided between the converters to delay the signal as PCM samples, thereby reducing delay line memory requirements.

14 Claims, 3 Drawing Sheets

DIGITAL MODEM ECHO CANCELER ENHANCEMENT

BACKGROUND OF THE INVENTION

The present invention relates to digital transmission systems. More specifically, the present invention relates to echo cancellation in transmission over digital modems.

In a typical analog modem implementation, a modem is connected through a hybrid circuit to the telephone network local loop. A local loop connects the local hybrid circuit to the local central office. The trunk network connects the local central office to the remote central office, which is then in turn connected to the remote hybrid circuit through a local loop at the remote end.

A hybrid circuit connects the modem or telephone two wire circuit to the local loop four wire circuit. Each circuit carries a signal in both direction, transmit and receive. A typical telephone network employs a hybrid converter to connect the unidirectional four wire link from the PSTN to the local two wire loop. The four wire circuit has one wire pair for the signal in each direction. The two wire pair must duplex the signal to carry both transmit and receive signals on a single wire pair. Part of the transmitted signal from the modem or telephone can be reflected back to the transmitter by the hybrid circuit, resulting in the speaker hearing his or her own speech delayed as an echo. This is referred to as near end echo.

A far end echo can also occur when the transmit signal passes through the PSTN and is reflected back by the hybrid at the far end of the PSTN.

In the typical analog modem implementation, FIG. 1, the modem 1 is connected through the hybrid circuit 2 to the telephone network local loop 3. The hybrid circuitry 2, as well as D/A and A/D converters 4 and 5, are selected to provide maximum linearity and the minimum possible noise floor, so that the overall modem performance, including the echo canceler, is maximized. With good implementation, the near end echo, which presents the major impairment in an analog modem, is canceled to the level of background noise floor. The far end echo, on the other hand, is passed through the PSTN 6 and to some degree non-linearly distorted due to non-linearities present in the network. However, the level of far end echo is attenuated due to local loop attenuation.

Unlike analog modems, digital modems, FIG. 2, are connected to the PSTN through digital T1 or E1 lines. The near end echo is typically nonexistent, because there is no local four to two wire conversion. On the other hand, the far end echo is more emphasized, because it is not attenuated by a local loop, since no local loop is present.

The signal which returns from the far end will pass through a PCM to linear converter before being combined with the echo cancellation signal. The echo cancellation signal and the signal received from the far end are both linear.

A modem echo canceler is typically implemented as a linear adaptive filter, which is used to adapt to the echo path. In theory, it is known that the filter convergence of a linear adaptive filter will be fastest when the input signal is uncorrelated. In an analog modem implementation, a typical near end echo loop is highly linear, and the input data to the echo canceler is uncorrelated (data-driven echo canceler), to provide for the optimal convergence properties.

However, in the digital modem case, the far end echo path, once it has returned to the near end, has passed through two PCM to linear and linear to PCM conversions, which present a significant source of non-linearities. One of those conversions is performed within the digital modem, and the other one is performed in the remote central office as part of the D/A or A/D conversion in the hybrid circuitry.

The typical PSTN digital modem connection is subject to far end echo which cannot be completely canceled using conventional approaches, i.e., a linear adaptive filter. In essence, the echo canceler synthesizes the far end echo which is then subtracted from the composite signal of the far end signal and echo. There are significant non-linearities present due to double conversions with the result that an echo canceler according to the prior art does not model the true echo path well and is limited to about 33 dB of rejection.

SUMMARY OF THE INVENTION

In order to improve the reduction of echo in a digital modem, the near end sample is taken after linear to PCM conversion and passed through a PCM to linear conversion before generation of the echo cancellation signal and recombination with the far end signal. The echo cancellation will more closely match any far end echo due to the introduction of conversion distortions more closely resembling those created by the conversion of the signal during transmission through the network.

The conversions experienced by the signal path are non-linear in nature due to the $\mu$-law or A-law conversions, and they present a major problem to a linear adaptive filter used in echo cancelers, since the filter is not able to cancel them. When linear signal samples are fed directly to an echo canceler, the amount of echo rejection is limited to about 33 dB. The present invention can improve echo rejection to about 36 dB.

In digital modem connections there is a need to improve echo rejection beyond 33 dB. The current invention, provides a transmitter modem configuration which introduces a linear to PCM conversion and a PCM to linear conversion in a conventional echo canceler line with a resultant improvement in the amount of echo rejection.

A modem-based echo cancellation system and method for increasing the amount of echo rejection in a digital modem. This increase is achieved by passing modem signals from the linear to PCM conversion, through digital delay line and a PCM to linear conversion before passing to the echo canceler. The signal provided to the echo canceler is thus converted from linear and reverted back to linear, partially matching the conversion distortion of the far end echo path, minimizing far end echo path non-linearity with the echo cancellation signal.

The present invention improves echo rejection in a PSTN digital modem connection. The present invention minimizes far end echo path non-linearity in an echo canceler line in a PSTN digital modem connection. The present invention reduces memory requirements for the echo canceler delay line by after linear to PCM conversion storing samples at low computational cost in a PSTN digital modem connection.

These and other objects are achieved by providing a digital modem-based echo cancellation system which feeds distorted transmit modem samples output from a linear to PCM conversion to an echo canceler line which incorporates an initial delay. The signal is next passed through a PCM to linear conversion. A linear adaptive filter then produces the echo cancellation signal. By modeling one linear to PCM conversion of the far end, in this way, the far end echo path non-linearity is minimized and rejection is improved.

BRIEF DESCRIPTION OF THE DRAWINGS

For a better understanding of the nature of the present invention its features and advantages, the subsequent detailed description is presented in connection with accompanying drawings in which.

DETAILED DESCRIPTION OF PREFERRED EXEMPLARY EMBODIMENTS

Figure 1:
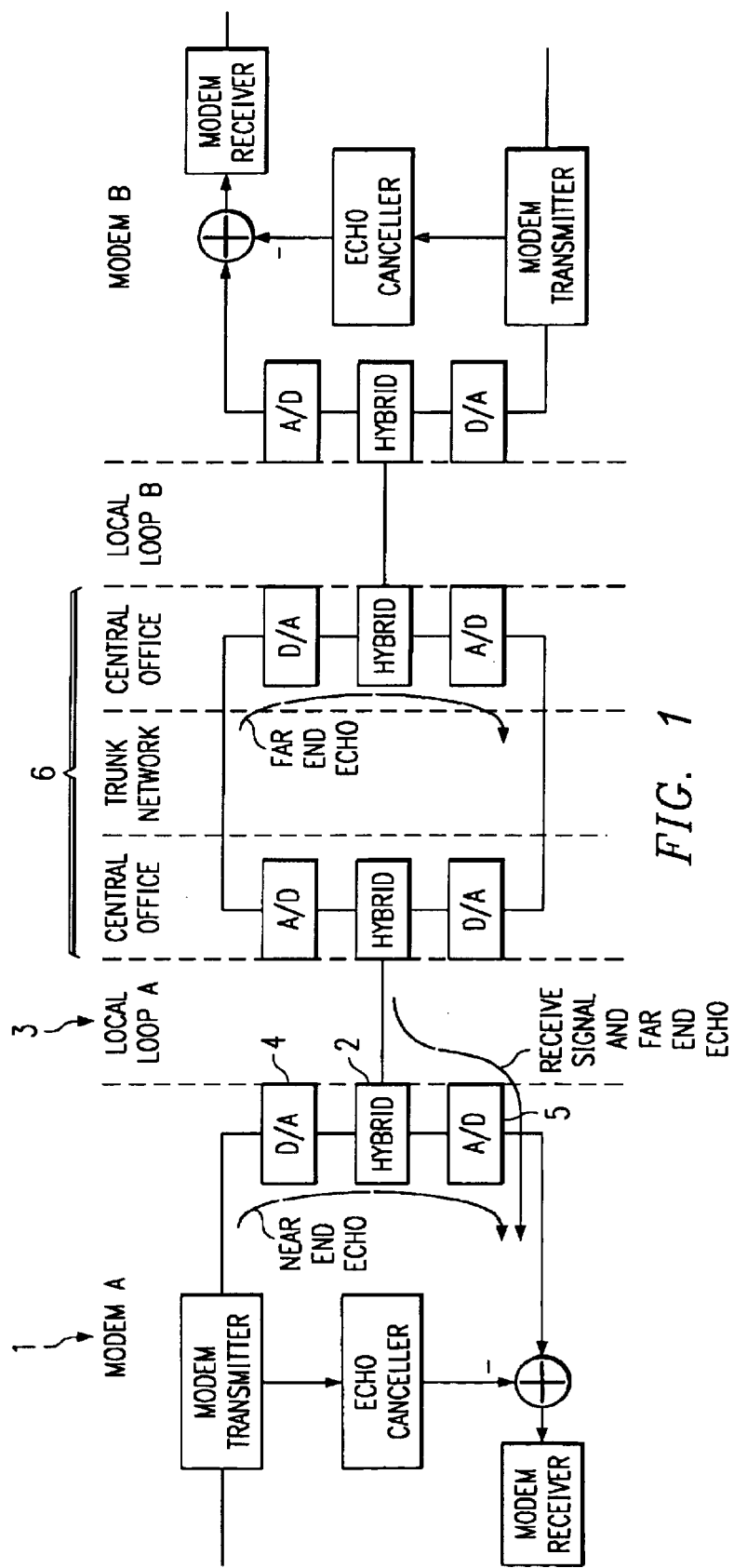
FIG. 1 is a diagram of a typical analog modem connection.
Figure 2:
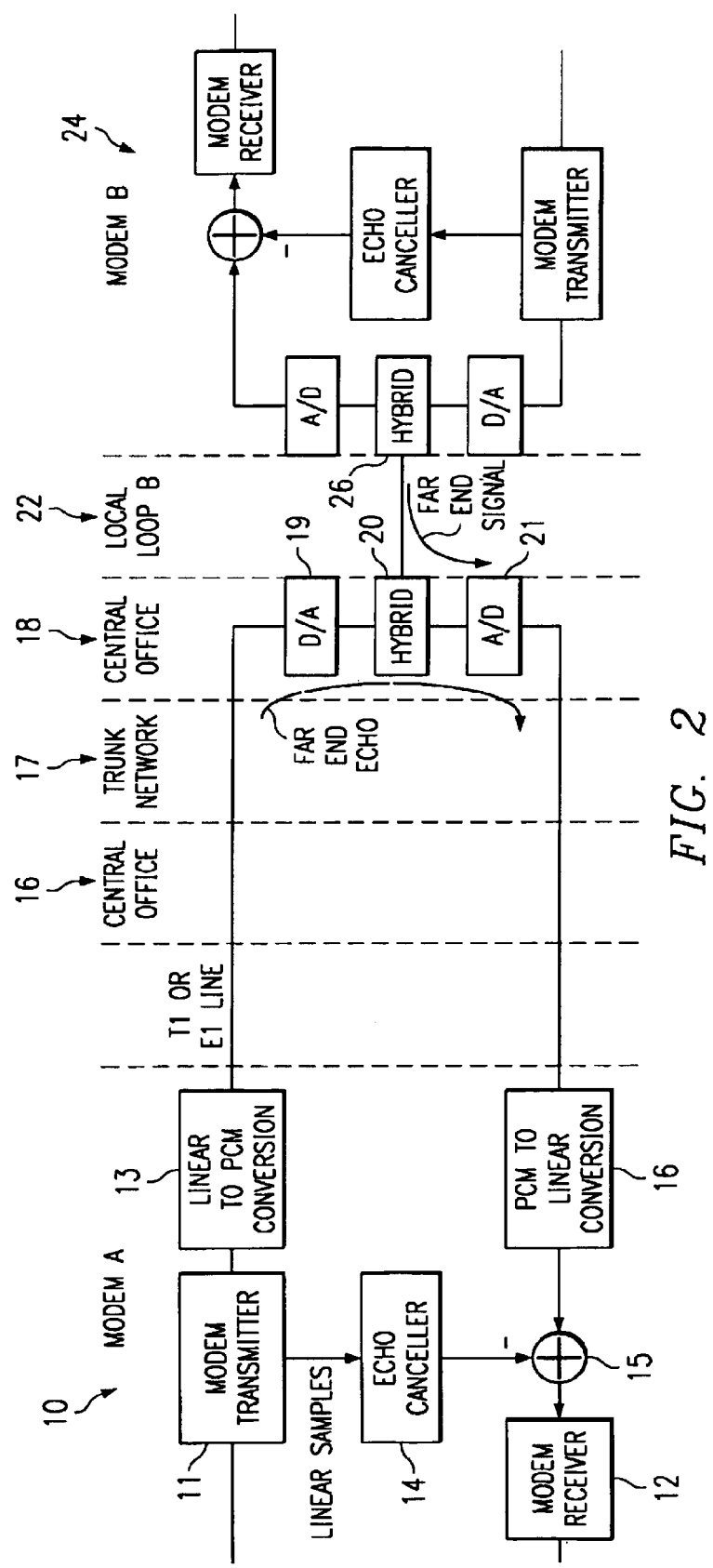
FIG. 2 is a diagram of a typical digital modem connection.

As illustrated in FIG. 2, a typical PSTN digital modem 10 includes a modem transmitter 11, a modem receiver 12, a linear to PCM converter 13 and an echo canceler 14. The modem is connected to a central office 16 and trunk network 17 through a T1 or E1 line 14. In the illustrated embodiment, the signal is converted to analog at D/A converter 19 at the far end central office 18 and supplied to the far end local loop 22 through a hybrid 20 at the far end. Far end central office 18, also includes A/D converter 21.

The signal from the far end modem 24 is transmitted through hybrid 26, and local loop 22 to hybrid 20. The far end signal is then converted to digital in A/D converter 21 for transmission through the network 17. Part of the far end signal can leak through hybrid 20 and become an echo on the signal passing back to the near end receiver 12. The far end signal and far end echo pass through PCM to linear converter 16.

After passing through converter 16, the far end signal and echo are combined at summer 15 with the output from echo canceler 14. Because the original linear near end signal is provided to echo canceler 14, before any PCM conversion, the linear distortion introduced into the echo coming form the far end is not present in the echo canceler signal. Although the far end echo has been converted back to a linear signal, distortions are present due to the dual conversions of this signal during its path. The differences between the converted echo signal and non converted echo canceling signal can reduce the effectiveness of the echo cancellation.

Figure 3:
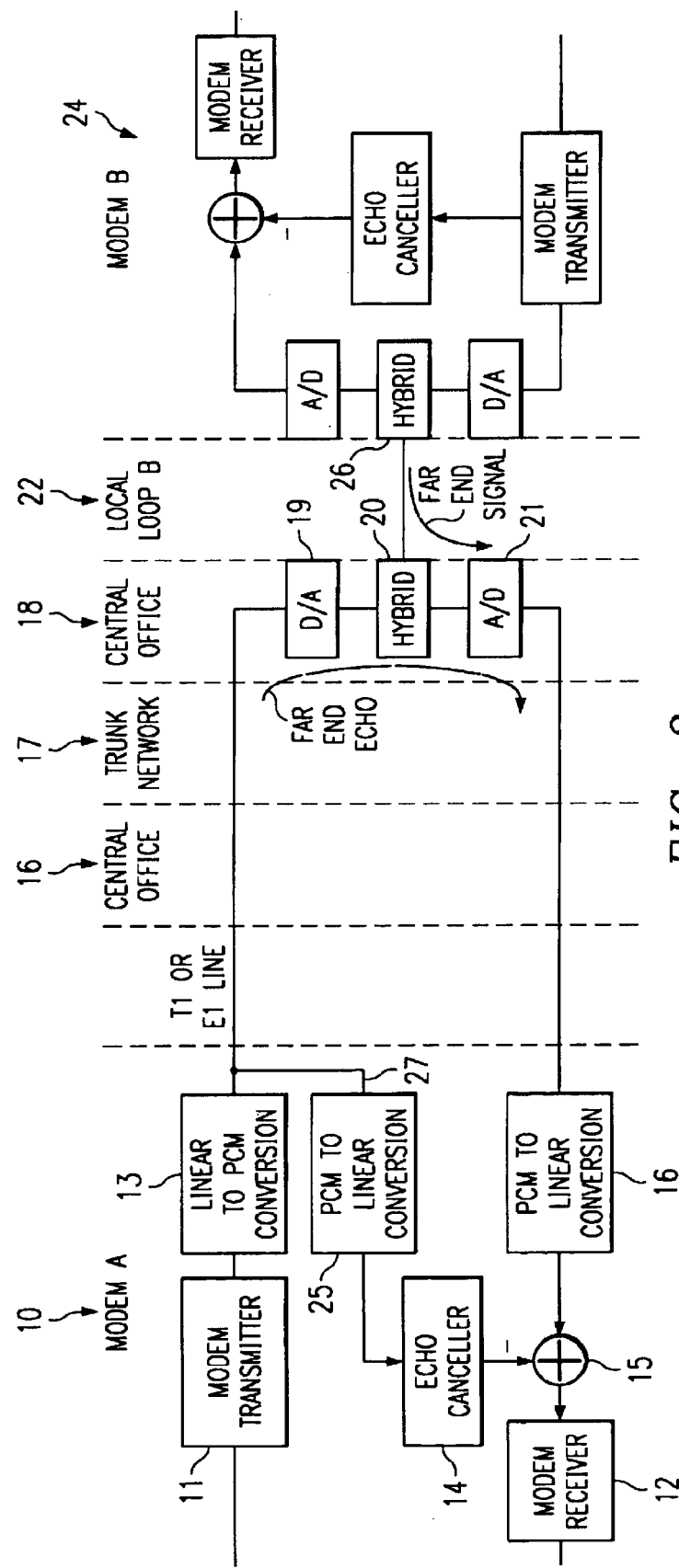
FIG. 3 is a diagram of an exemplary embodiment of a modem-based improved echo cancellation system according to the present invention.

In the exemplary embodiment, FIG. 3, an improvement in the amount of echo rejection, over that attainable by the configuration illustrated in FIG. 2, is achieved by providing the near end signal to the echo canceler 14, after linear to PCM conversion 13 and through additional PCM to linear converter 25. The dual conversion of the near end signal prior to the echo canceler introduces non-linearities into the echo cancellation signal to better match the far end echo when recombined at summer 15.

The dual conversion of the echo cancellation signal path reduces the effect of non-linearities in the far end echo path. In the preferred embodiment the distorted transmit modem samples are reconverted, i.e., following the linear to PCM conversion 13 the distorted samples are fed through a delay line to a PCM to linear converter 25 prior to providing the signal to the echo canceler 14. This effectively introduces non-linearities into the echo cancellation signal, reducing the effects of the linear to PCM and PCM to linear conversions from the far end echo path being estimated thereby increasing echo cancellation effectiveness. The achievable rejection using the preferred embodiment is about 36 dB, which is 3 dB better than the prior art method, FIG. 2.

The delay necessary to match the network delay of the far end echo can be accomplished by the inclusion of a delay line between linear to PCM converter 13 and PCM to linear converter 25. By placing the delay line between these converters, the delay line stores a PCM signal, therefore requiring less memory than storage of the original linear signal. The delay line could be placed between converter 25 and echo canceler 14, within the scope of the invention. This embodiment would achieve the increased echo reduction from the compensation for non-linearities discussed above but would not benefit from the reduced memory requirements of a PCM delay line.

Typical network delays are of the order of 10–100 ms. However, in the case of satellite links delays of up to 1.2 seconds could be encountered. In modern DSPS, this delay requires storage, usually represented by 16 or more bits of up to 9.6 k words, assuming an 8 kHz sampling rate. Using the approach of the preferred embodiment, the converted data could be stored with two or more echo delay line samples in the same word. This would result in a significant reduction in memory requirements for a small increase in computational cost.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A modem, comprising:
    a modem transmitter providing a transmit signal;
    a linear-to-PCM converter receiving said transmit signal and producing a PCM transmit signal;
    an echo canceler;
    a PCM to linear converter coupled between said linear to PCM converter and said echo canceler, providing linear transmit signal samples to said echo canceler; and
    a delay line, coupled between said linear to PCM converter and said echo canceler, for delaying said PCM transmit signal to match a network delay of a far-end network echo.

2. The modem of claim 1, further comprising:
    a second PCM to linear converter configured to receive signals from an external source;
    a summer coupled to said second PCM to linear converter and to said echo canceler, wherein said second PCM to linear converter provides a receive signal to said summer and said echo canceler provides an echo cancellation signal to said summer, for combining said receive signal and said echo cancellation signal to provide an echo-reduced receive signal; and
    a modem receiver coupled to said summer to accept said echo-reduced receive signal.

3. The modem of claim 2, wherein said received signal does not include a near-end echo.

4. The modem of claim 1, further comprising:
    a delay line coupled between said linear to PCM converter and said PCM to linear converter to delay said PCM signal for delaying said PCM transmit signals to match said network delay of said far-end network echo before reconverting in said PCM to linear converter.

5. The modem of claim 4, wherein said delay line comprises:
    storage for said PCM signal wherein said storage comprises storage adequate to hold delay line samples that match said far-end echo in said network.

6. The modem of claim 1, wherein said delay line is coupled between said linear to PCM converter and said PCM to linear converter for transmitting said PCM transmit signals directly to said PCM to linear converter.

7. The modem of claim 1, wherein said delay line is coupled between said PCM to linear converter and said echo canceler for transmitting said PCM transmit signals directly to said echo canceler.

8. A method for enhanced echo cancellation in a digital modem comprising:

receiving modem transmit signals comprising a far-end network echo, converted from linear to PCM transmit signals in a linear to PCM converter;

reconverting, in a PCM to linear converter, said PCM transmit signals to reconverted linear transmit signals;

producing an echo cancellation signal in an echo canceler from said reconverted linear transmit signals; and delaying said converted signals in a delay line, prior to said producing, to match a network delay of said far-end network echo.

9. The method of claim 2, further comprising:

receiving PCM signals from an external source;

converting said received signals from PCM to a linear receive signal;

subtracting said echo cancellation signal from said converted linear receive signal to achieve an echo-reduced receive signal; and providing said echo-reduced receive signal to a modem receiver.

10. The method of claim 2, wherein said received PCM signal does not include a near-end echo.

11. The method of claim 8, wherein said delaying comprises delaying said PCM transmit signals to match a network delay of said far end network echo before said reconversion.

12. The method of claim 11, wherein said delaying comprises transmitting said PCM transmit signals directly to said PCM to linear converter.

13. The method of claim 8, wherein said delaying comprises delaying said PCM transmit signals, after said reconverting and before said producing, to match a network delay of said far-end network echo.

14. The method of claim 13, wherein said delaying comprises transmitting said PCM transmit signals directly to said echo canceler.

* * * * *